(12) United States Patent
Hamilton et al.

(10) Patent No.: US 12,351,112 B2
(45) Date of Patent: Jul. 8, 2025

(54) LIFTGATE MOUNTED SENSOR ASSEMBLY

(71) Applicant: Ford Global Technologies, LLC, Dearborn, MI (US)

(72) Inventors: Tyler D. Hamilton, Farmington, MI (US); Venkatesh Krishnan, Canton, MI (US); Michael Robertson, Jr., Garden City, MI (US); Moura Renato da Rosa Borges, Salvador/Bahia (BR); Henrico Quinelato, Pituaçu/Salvador (BR)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 17/932,412

(22) Filed: Sep. 15, 2022

(65) Prior Publication Data

US 2024/0092278 A1    Mar. 21, 2024

(51) Int. Cl.
*B60R 11/04* (2006.01)
*B60J 5/10* (2006.01)
*B60Q 1/00* (2006.01)

(52) U.S. Cl.
CPC ............ *B60R 11/04* (2013.01); *B60J 5/10* (2013.01); *B60Q 1/0023* (2013.01); *B60R 2300/301* (2013.01); *B60R 2300/80* (2013.01)

(58) Field of Classification Search
CPC . B60R 11/04; B60R 2011/004; B60Q 1/0023; B60J 5/10; B60J 5/101; B60J 5/107; B60J 5/108; B62D 33/023; B62D 33/0273
USPC ........... 296/56, 146.1, 152, 50, 146.8, 146.5
See application file for complete search history.

(56) References Cited

U.S. PATENT DOCUMENTS

| | | | |
|---|---|---|---|
| 9,150,165 B1 * | 10/2015 | Fortin | B60R 11/04 |
| 10,024,970 B2 * | 7/2018 | Hoffman, Jr. | B60R 13/04 |
| 10,525,937 B2 | 1/2020 | Zhao et al. | |
| 10,914,820 B2 | 2/2021 | Ratner | |
| 10,981,518 B1 | 4/2021 | Krishnan et al. | |
| 11,220,222 B2 * | 1/2022 | Kitagawa | B60R 19/18 |
| 11,240,941 B2 | 2/2022 | Frederick et al. | |
| 2016/0096486 A1 * | 4/2016 | Dziurda | H04N 7/183 348/375 |
| 2016/0297437 A1 * | 10/2016 | Hara | G01S 7/4813 |
| 2021/0031701 A1 | 2/2021 | Kitagawa et al. | |
| 2022/0098915 A1 * | 3/2022 | Matori | B60R 11/04 |
| 2022/0111822 A1 * | 4/2022 | Matsunaga | H02K 5/24 |
| 2022/0282529 A1 * | 9/2022 | Miyake | E05B 79/06 |
| 2023/0107750 A1 * | 4/2023 | Leterrier | B60J 5/107 296/146.5 |

(Continued)

FOREIGN PATENT DOCUMENTS

CN    202294581 U    7/2012

*Primary Examiner* — Amy R Weisberg
*Assistant Examiner* — Wenwei Zhuo
(74) *Attorney, Agent, or Firm* — Frank A. McKenzie; Brooks Kushman P.C.

(57) ABSTRACT

An assembly includes a liftgate having a frame and a body panel supported by the frame, the body panel defining a plurality of openings, the openings providing access to the frame. The assembly includes a first cover covering the plurality of openings of the body panel. The assembly includes a second cover supported by the first cover and defining a chamber therebetween. The assembly includes a sensor assembly supported within the chamber between the first cover and the second cover.

20 Claims, 8 Drawing Sheets

(56) References Cited

U.S. PATENT DOCUMENTS

2024/0042838 A1* 2/2024 Cretier .................. B60J 5/0416
2024/0066963 A1* 2/2024 Ginja .................... B60J 5/0415

* cited by examiner

LIFTGATE MOUNTED SENSOR ASSEMBLY

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
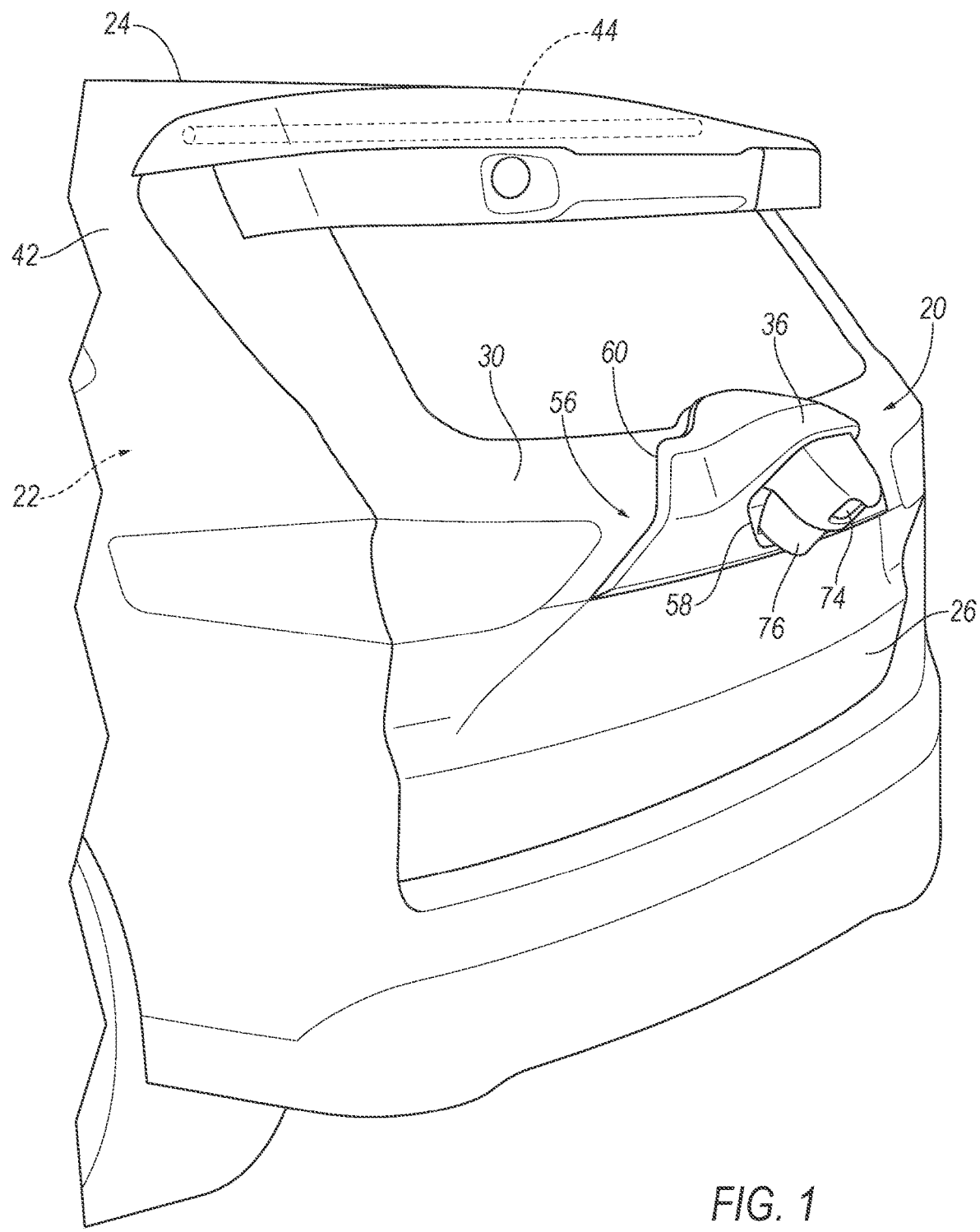
FIG. 1 is a perspective view of a rear of a vehicle with a sensor assembly supported on a liftgate.
Figure 2:
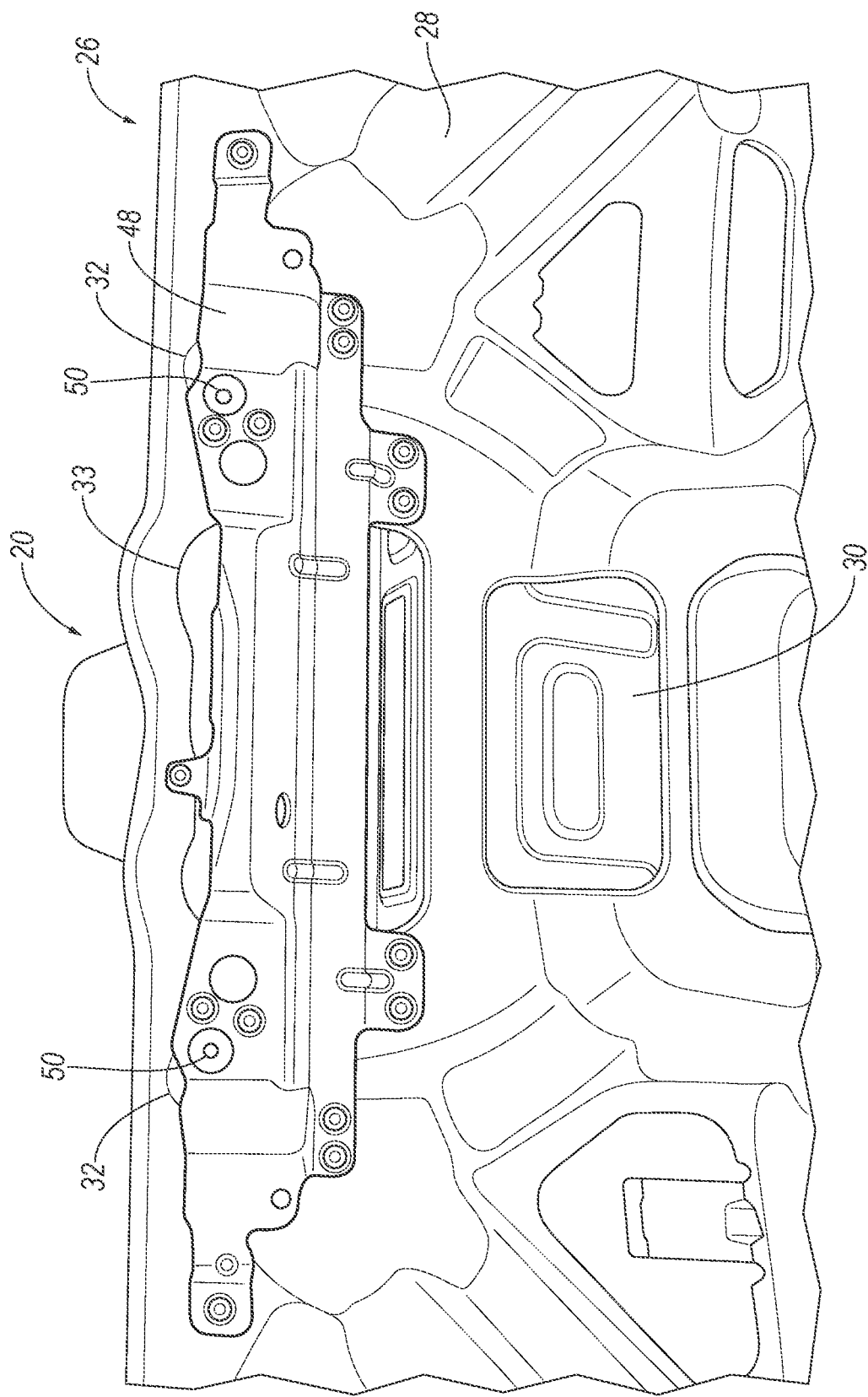
FIG. 2 is a vehicle-rearward facing view of a support plate fixed a frame of the liftgate.
Figure 3:
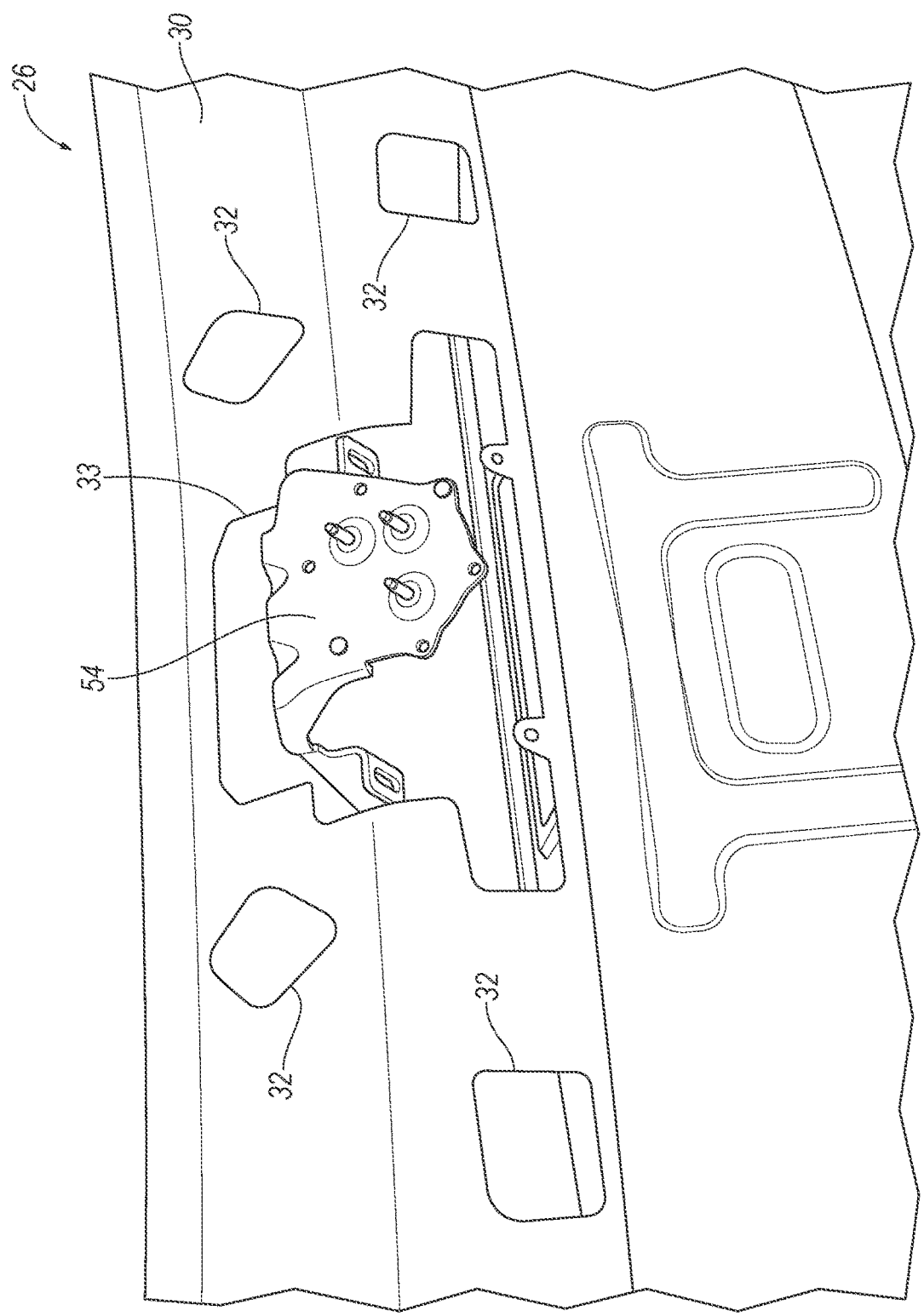
FIG. 3 is a vehicle-forward facing view of a body panel of the liftgate and a support bracket for the sensor assembly.
Figure 4:
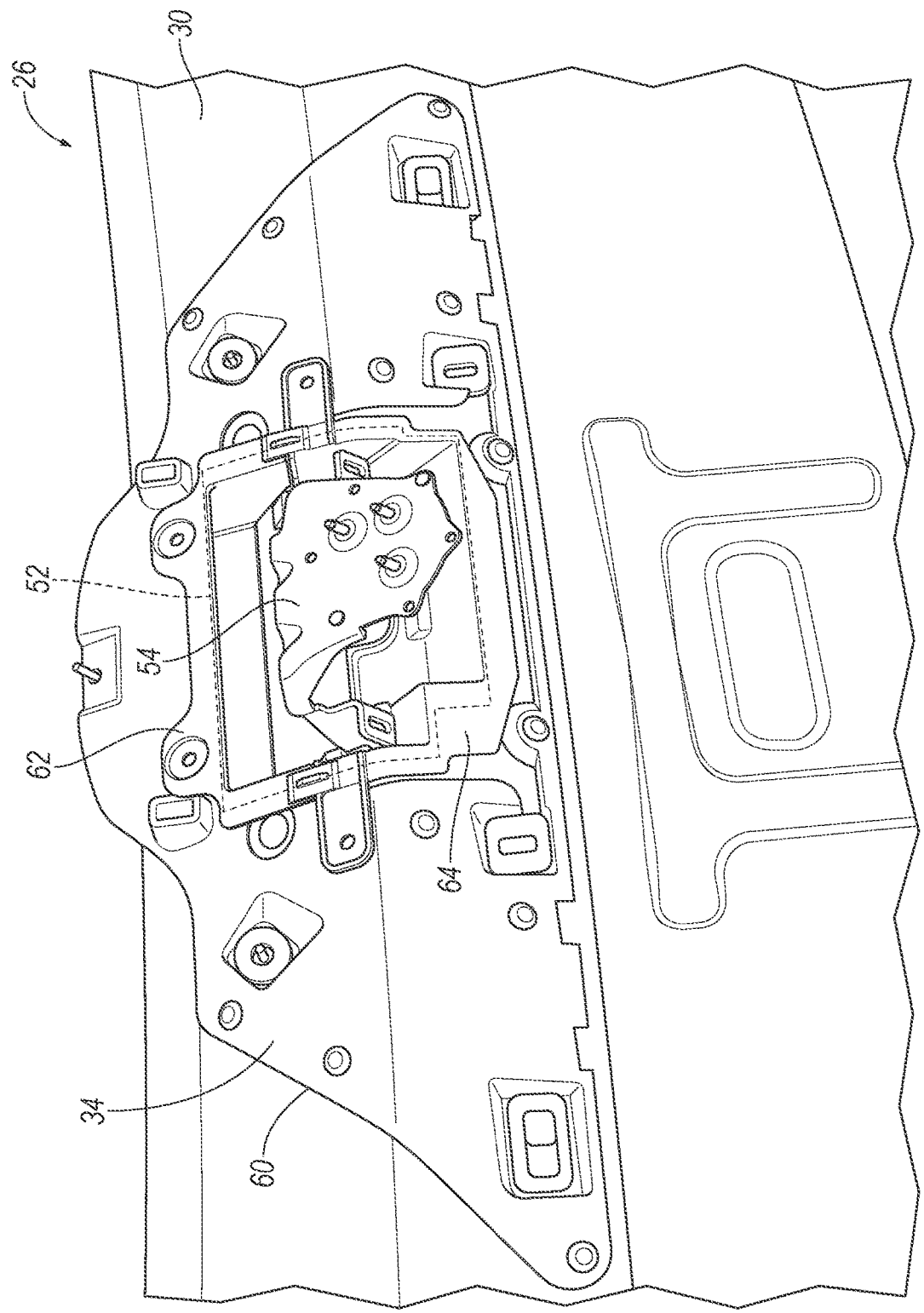
FIG. 4 is a vehicle-forward facing view of the body panel of the liftgate with a first cover supported by the body panel.
Figure 5:
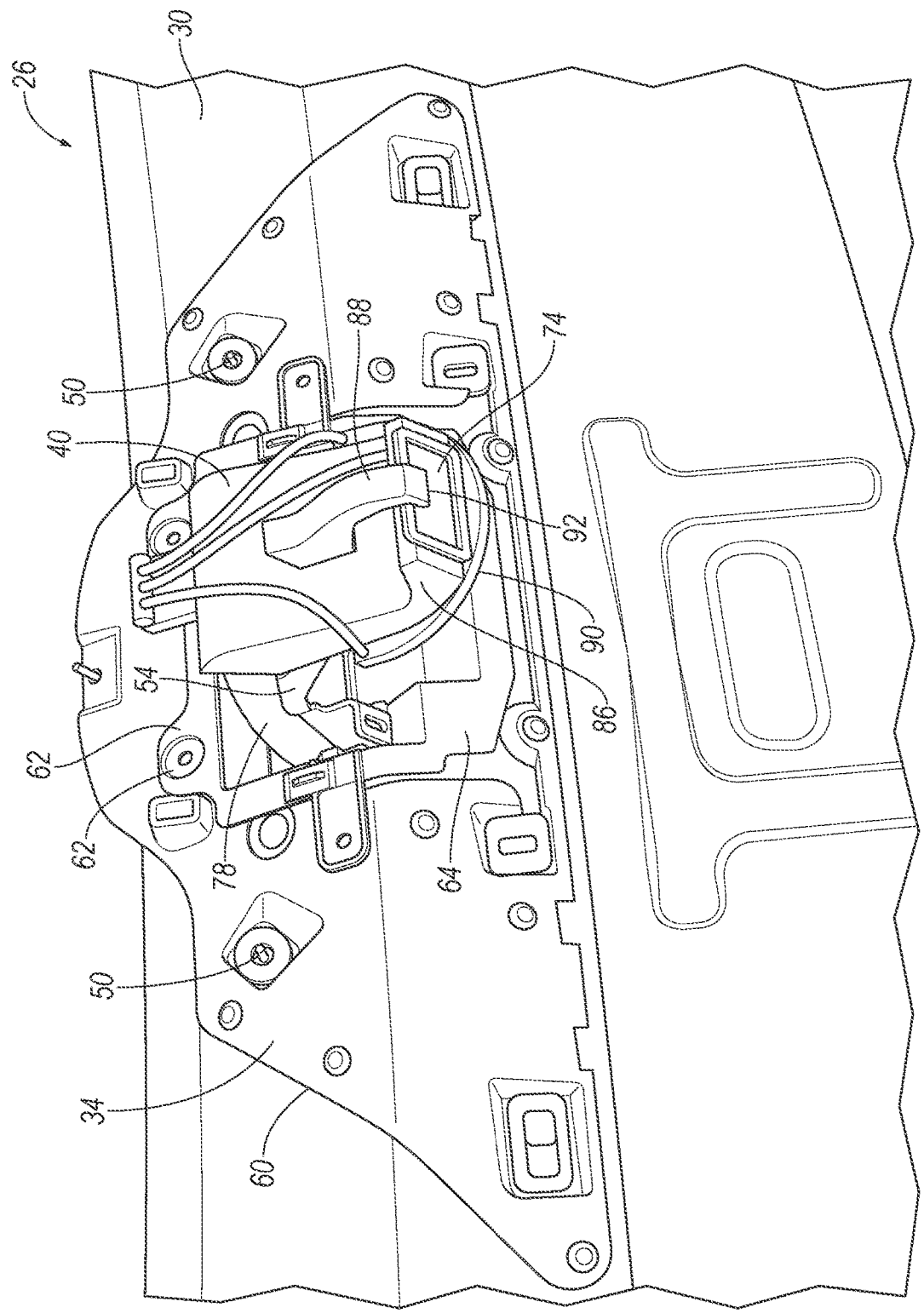
FIG. 5 is a vehicle-forward facing view of the body panel of the liftgate with components of the sensor assembly supported on the support bracket.
Figure 6:
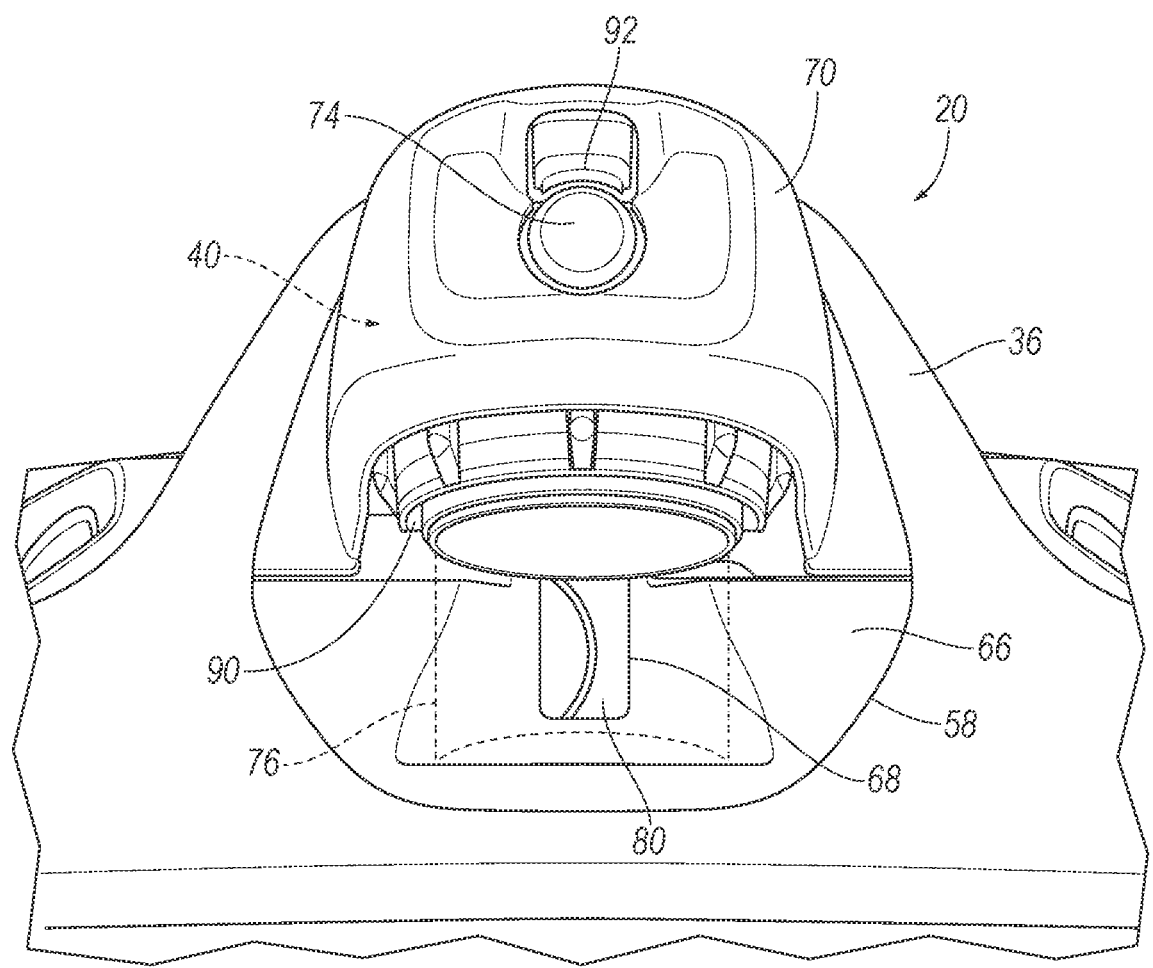
FIG. 6 is a perspective view of a portion perspective the liftgate and the sensor assembly.
Figure 7:
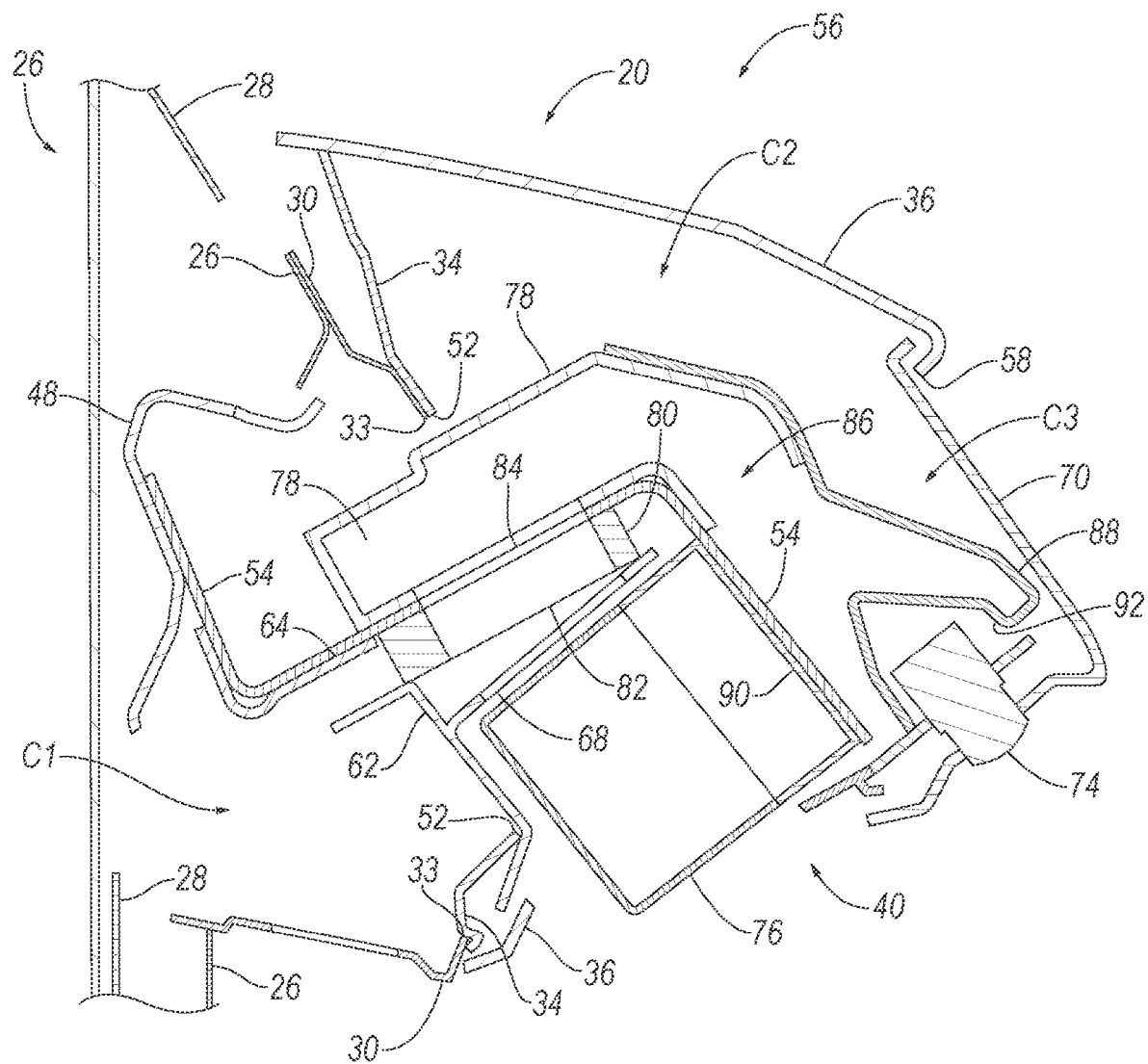
FIG. 7 is a cross-section schematic of a portion the liftgate and components supported by the liftgate.
Figure 8:
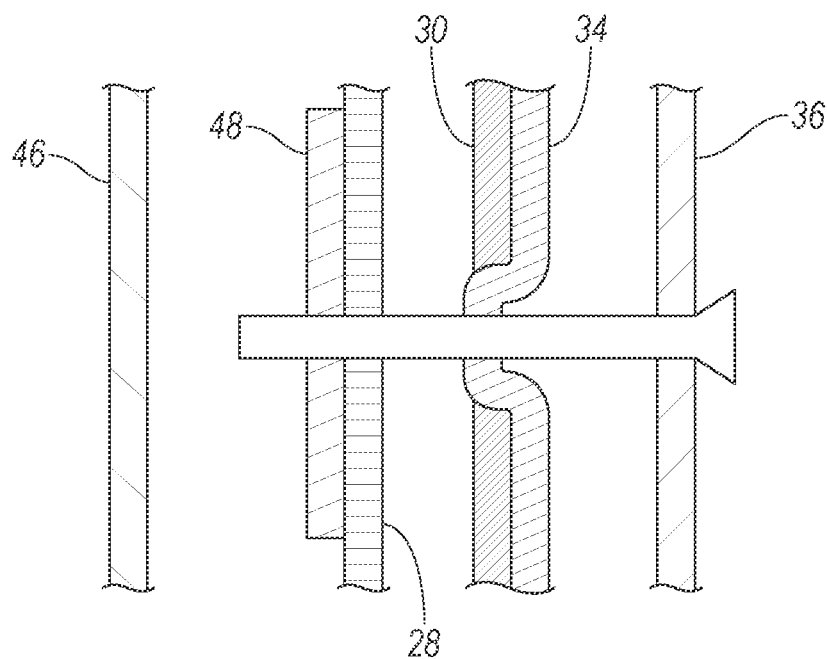
FIG. 8 is a cross-section schematic of another portion the liftgate and components supported by the liftgate.
Figure 9:
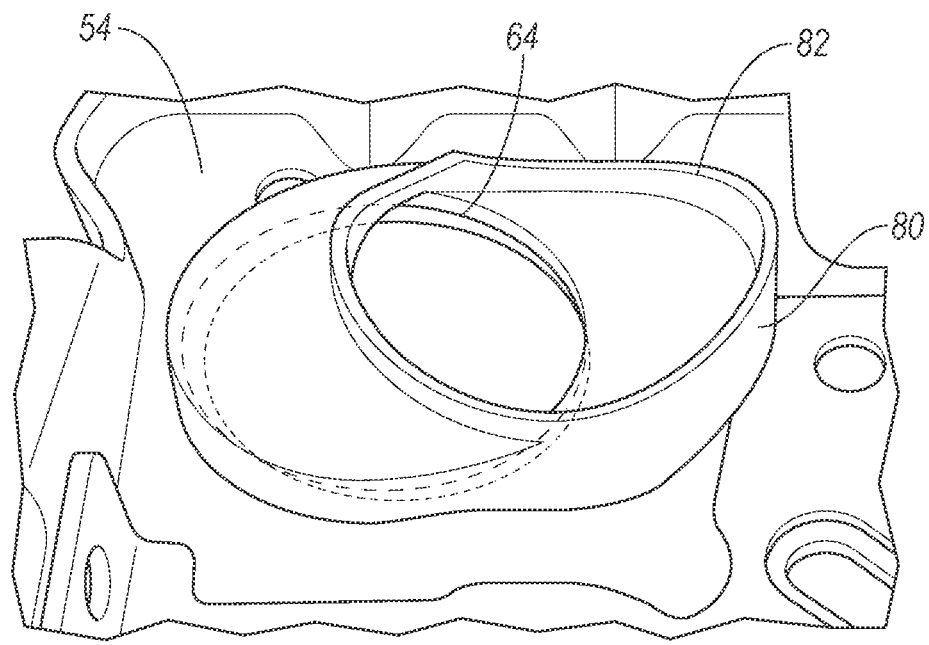
FIG. 9 is a perspective view of a duct that directs air to the sensor assembly.

An assembly includes a liftgate having a frame and a body panel supported by the frame, the body panel defining a plurality of openings, the openings providing access to the frame. The assembly includes a first cover covering the plurality of openings of the body panel. The assembly incudes a second cover supported by the first cover and defining a chamber therebetween. The assembly includes a sensor assembly supported within the chamber between the first cover and the second cover.

The assembly may include a support plate fixed to the frame of the liftgate, the sensor assembly supported by the support plate.

The frame and the body panel may be between the first cover and the support plate.

The assembly may include a plurality of fasteners fixing the support plate to the frame, the plurality of fasteners at the plurality of openings of the body panel.

The assembly may include a support bracket fixed to the support plate, the sensor assembly supported by the support bracket.

The first cover may define an opening, the support bracket extending through the opening.

The assembly may include a third cover supported by the first cover and covering at least part of the opening the first cover.

The assembly may include a fourth cover supported by the first cover and covering at least part of the opening the first cover, the support bracket extending through the opening between the third cover and the fourth cover.

The second cover may define a second cover opening, and the assembly may include an inlet cover supported at the second cover opening.

The inlet cover may define an inlet cover opening, and the sensor assembly may include a blower operatively coupled to the inlet cover to draw air through the inlet cover opening.

The assembly may include a duct connecting the inlet cover opening to the blower.

The duct may be foam.

The duct may include an inlet and an outlet, the inlet and the outlet have a common orientation and are laterally offset relative to each other.

The duct may be sealed to the inlet cover.

The sensor assembly may include a sensor and a second duct that extends from the blower to an exhaust oriented to direct air across the sensor of the sensor assembly.

The sensor may be a lidar sensor and the exhaust may be ring-shaped surrounding the lidar sensor.

The lidar sensor may be positioned at the inlet cover opening.

The sensor assembly may include a second sensor and a third duct that extends from the second duct to a second exhaust oriented to direct air across the second sensor of the sensor assembly.

The second sensor may be a camera.

The assembly may include a sensor cover supported by the liftgate and defining a second chamber, the second sensor in the second chamber.

With reference to the Figures, wherein like numerals indicate like parts throughout the several views, an example assembly 20 for limiting airflow into a passenger compartment 22 of a vehicle 24 is shown. The assembly 20 includes a liftgate 26 having a liftgate frame 28 and a liftgate body panel 30 supported by the liftgate frame 28. The liftgate body panel 30 and the liftgate frame 28 define a first chamber C1 therebetween. The liftgate body panel 30 defines a plurality of openings 32 providing access to the first chamber C1 and the liftgate frame 28. The assembly 20 includes a first cover 34 extending across the plurality of openings 32 of the liftgate body panel 30. The assembly 20 includes a second cover 36 supported by the first cover 34 and defining a second chamber C2 therebetween. The first cover 34 separates the first chamber C1 from the second chamber C2 at the plurality of openings 32. The assembly 20 includes a sensor assembly 40 supported within the second chamber C2 between the first cover 34 and the second cover 36. The first cover 34 separating the first chamber C1 from the second chamber C2 at the plurality of openings 32 may limit airflow into the passenger compartment 22 at a rear of the vehicle 24 by blocking airflow through the openings 32 from the first chamber C1 to the second chamber C2.

With reference to FIG. 1, the vehicle 24 may be any suitable type of ground vehicle, e.g., a passenger or commercial automobile such as a sedan, a coupe, a truck, a sport utility, a crossover, a van, a minivan, a taxi, a bus, etc. The vehicle 24 can include a system or systems for autonomously or semi-autonomously operating the vehicle 24, e.g., an advanced driver assist system ADAS for speed control, lane-keeping, etc.

The vehicle 24 may include a vehicle body 42. The vehicle body 42 includes body panels partially defining an exterior of the vehicle 24. The body panels may present a class-A surface, e.g., a finished surface exposed to view by a customer and free of unaesthetic blemishes and defects. The body panels include, e.g., a roof, etc.

The vehicle body 42 defines the passenger compartment 22 to house occupants, if any, of the vehicle 24. The passenger compartment 22 may extend across the vehicle 24, i.e., from one side to the other side of the vehicle 24. The passenger compartment 22 includes a front end and a rear end with the front end being in front of the rear end during forward movement of the vehicle 24. The passenger compartment 22 may further include a cargo area, e.g., behind a rearmost row of seats.

The liftgate 26 is openable at a rear of the vehicle 24 to provide access to the passenger compartment 22, e.g., to the cargo area. The liftgate 26 is movable between an open position allowing access to the cargo area and a closed position inhibiting access to the cargo area and enclosing the passenger compartment 22. The liftgate 26 may pivot between the open position and the closed position. For example, a hinge 44 may connect the liftgate 26 to the roof of the vehicle 24. The liftgate 26 may include a window opening and a window disposed in the window opening.

With reference to FIGS. 1-3, 7, and 8, the liftgate 26 includes the liftgate frame 28, the liftgate body panel 30, and a liftgate trim 46. The liftgate frame 28 may provide structural rigidity and mounting locations for components, e.g., for the window, the liftgate body panel 30, the liftgate trim 46, a support plate 48, etc. The liftgate body panel 30 and the liftgate trim 46 may be supported by the liftgate frame 28, e.g., fixed relative to the liftgate frame 28. The liftgate trim 46 is fixed opposite the liftgate body panel 30 relative to the liftgate frame 28. The liftgate trim 46 is inboard relative to the liftgate frame 28, and the liftgate body panel 30 is outboard relative to the liftgate frame 28. The liftgate body panel 30 and the liftgate frame 28 define the first chamber C1 therebetween, e.g., along a vehicle-longitudinal axis. The liftgate frame 28 may be metal such as steel, aluminum, etc. or polymeric such as fiber reinforced plastic composite, etc.

The liftgate body panel 30 is supported by the liftgate frame 28, e.g., fixed relative to the liftgate frame 28. The liftgate body panel 30 faces outboard relative to the vehicle 24. The liftgate body panel 30 may present a class-A surface, i.e., a surface specifically manufactured to have a high-quality, finished aesthetic appearance free of blemishes. The liftgate body panel 30 may be metal such as steel, aluminum, etc. or polymeric such as fiber reinforced plastic composite, etc. The liftgate body panel 30 defines the plurality of openings 32. The plurality of openings 32 defined by the liftgate body panel 30 may provide access to the first chamber C1 and the liftgate frame 28. For example, the plurality of openings 32 may be at mounting locations of the liftgate frame 28, e.g., where the support plate 48 is fixed to the liftgate frame 28, and fasteners and/or tooling may be inserted through the openings 32 into the first chamber C1. The liftgate body panel 30 may be fixed rearward of the liftgate frame 28. The liftgate body panel 30 may define a bracket opening 33. The bracket opening 33 permits a sensor support bracket 54 supported by the liftgate frame 28 to extend out of the first chamber C1. The plurality of openings 32 may be disposed at various positions about the bracket opening 33, e.g., the bracket opening 33 may be generally centered relative to the plurality of openings 32.

The liftgate trim 46 may be supported by the liftgate frame 28, e.g., fixed relative to the liftgate frame 28. The liftgate trim 46 faces inboard relative to the vehicle 24. The liftgate trim 46 may present a class-A surface and may be a material suitable for an interior of the vehicle 24, such as vinyl, plastic, leather, wood, etc. The liftgate trim 46 may be fixed forward of the liftgate frame 28.

The support plate 48 is fixed to the liftgate frame 28 and supports the sensor assembly 40. For example, the assembly 20 may include a plurality of fasteners 50 fixing the support plate 48 to the liftgate frame 28. The plurality of fasteners 50 may be at the plurality of openings 32 of the liftgate body panel 30. The openings 32 may provide access to install the fasteners 50 to the liftgate frame 28 and the support plate 48. Additionally or alternately, the support plate 48 may be fixed to the liftgate frame 28 via weld, other fasteners, adhesive, or any other suitable structure. The support plate 48 may be fixed forward of the liftgate frame 28. The support plate 48 may be below the window along a vehicle-vertical axis.

With reference to FIGS. 4-8, the first cover 34 extends across the plurality of openings 32 of the liftgate body panel 30 and separates the first chamber C1 from the second chamber C2 at the plurality of openings 32, e.g., limiting air flow through the plurality of openings 32 and into the passenger compartment 22. The first cover 34 may extend continuously over each of the openings 32, i.e., without any openings or the like in the first cover 34 at the openings 32. The first cover 34 is supported at an outboard rearward facing surface of the liftgate body panel 30, e.g., the liftgate frame 28 and the liftgate body panel 30 may be between the first cover 34 and the support plate 48. The first cover 34 may be fixed to the support plate 48 and/or the liftgate frame 28. For example, the plurality of fasteners 50 fixing the support plate 48 to the frame may fix the first cover 34 to the support plate 48 to the liftgate frame 28. The first cover 34 defines a first cover opening 52. The first cover opening 52 enables components, such as the sensor support bracket 54, to enter the second chamber C2 defined by the first cover 34 and the second cover 36. The first cover 34 may be fixed rearward of the liftgate frame 28.

The second cover 36 and the first cover 34 collectively provide a housing 56 for the sensor assembly 40. For example, the first cover 34 and the second cover 36 define the second chamber C2 therebetween and with the sensor support bracket 54 and the sensor assembly 40 disposed therein. The second cover 36 is supported by the first cover 34. For example, fasteners or the like may fix the second cover 36 to the first cover 34, the second cover 36 may be snap fit to the first cover 34, etc. The second cover 36 may be outboard of the first cover 34. In other words, the first cover 34 may be between the liftgate body panel 30 and the first cover 34. The second cover 36 defines a second cover opening 58. The second cover 36 may be sealed to the first cover 34, e.g., about an outer perimeter 60. For example, the first cover 34 may abut the second cover 36 about the outer perimeter 60, a gasket may be disposed between the first cover 34 and the second cover 36 about the outer perimeter 60, etc. The first cover 34 and the second cover 36 may be below the window along the vehicle-vertical axis.

The support bracket 54 for the sensor assembly 40 may be fixed to the support plate 48, e.g., via weld, fasteners, adhesive, or any other suitable structure. The support bracket 54 may extend through the opening 52 of the first cover 34. For example, the support bracket 54 may extend rearward from the support plate 48 on one side of the first cover 34 through the opening 52 to an opposite side of the first cover 34. The support bracket 54 may extend from the support plate 48 to inside the second chamber C2. The sensor assembly 40 may be fixed to the support bracket 54.

The housing 56 may include a third cover 62 and a fourth cover 64 that limit airflow through the first cover opening 52. The third cover 62 and the fourth cover 64 may be supported by the first cover 34. For example, the third cover 62 and the fourth cover 64 may be fixed to the first cover 34 with fasteners, snap fit, etc. The third cover 62 and the fourth cover 64 each cover at least part of the first cover opening 52 and may cover part of the bracket opening 33. The support bracket 54 may extend through the first cover opening 52 between the third cover 62 and the fourth cover 64. For example, the third cover 62 may be supported above the support bracket 54 and the fourth cover 64 may be below the support bracket 54. The third cover 62 and the fourth cover 64 may abut, e.g., at the first cover opening 52. The third cover 62 and the fourth cover 64 may abut the support bracket 54.

The housing 56 may include an inlet cover 66 that defines an inlet cover opening 68. The inlet cover opening 68 enables intake of air, e.g., from outside the second chamber C2. Air entering the inlet cover opening 68 may be used to cool the sensor assembly 40 and/or may maintain clear fields of view of the sensor assembly 40. The inlet cover 66 may be supported at the second cover opening 58, e.g., covering at least a portion of the second cover opening 58. The inlet cover 66 may be fixed to the first cover 34 and/or the second cover 36, e.g., via fasteners, snap fit, etc.

The housing 56 may include a sensor cover 70 that defines a third chamber C3. The sensor cover 70 encloses and protects a sensor 74 of the sensor assembly 40, e.g., in the third chamber C3 and as described below. The sensor cover 70 is supported by the liftgate 26, e.g., via the second cover 36. The sensor cover 70 may be fixed to the second cover 36, e.g., via fasteners, snap fit, etc.

The sensor assembly 40 can obtain one or more measurements of various physical phenomena to detect objects external of the vehicle 24. The sensor assembly 40 can provide data to a vehicle computer indicating, e.g., a location of an object, a speed of an object, a type of an object, etc. The computer may use the information provided by the sensor assembly 40 to autonomously or semi-autonomously operate the vehicle 24. The sensor assembly 40 is supported within the second chamber C2 between the first cover 34 and the second cover 36. For example, one or more components of the sensor assembly 40 can be disposed within the second chamber C2. The sensor assembly 40 may be supported within the third chamber C3 of the sensor cover 70. For example, one or more components of the sensor assembly 40 can be disposed within the third chamber C3. The sensor assembly 40 may be supported by the support plate 48 and the support bracket 54. For example, one or more components of the sensor assembly 40 can be fixed to the support bracket 54.

The sensor assembly 40 includes one or more sensors 74, 76 that detect external of the vehicle 24, e.g., as are known to provide data to the vehicle 24 computer. For example, the sensor assembly 40 can include one or more radar sensors, scanning laser range finders, lidar sensors, and/or image processing sensors such as a camera.

The camera 74 may detect visible light, infrared radiation, ultraviolet light, or some range of wavelengths including visible, infrared, and/or ultraviolet light. For example, the camera 74 can include a charge-coupled device CCD, complementary metal oxide semiconductor CMOS or any other suitable type. For another example, the camera 74 may be a time-of-flight TOF camera, which includes a modulated light source for illuminating the environment and detect both reflected light from the modulated light source and ambient light to sense reflectivity amplitudes and distances to the scene. The camera 74 may be supported in the third chamber C3 defined by the sensor cover 70. The camera 74 may be fixed to the support bracket 54, e.g., in the third chamber C3.

The lidar sensor 76 or LIDAR, i.e., Light Detection and Ranging is similar to radar, but uses laser light transmissions instead of radio transmissions to obtain reflected light pulses from objects. The reflected light pulses can be measured to determine object distances. Data from a lidar can be provided to generate a three-dimension representation of detected objects, sometimes referred to as a point cloud. The lidar sensor 76 may positioned at the inlet cover opening 68. For example, the lidar sensor 76 may be at a common position along a cross-vehicle axis. The lidar sensor 76 and the inlet cover opening 68 may be centered relative to the vehicle body 42 along the cross-vehicle axis. The lidar sensor 76 may be rearward of the inlet cover opening 68. For example, the inlet cover 66 may be between the first cover 34 and the lidar sensor 76. The lidar sensor may be fixed to the support bracket 54.

The sensor assembly 40 may include a blower 78, e.g., to provide air flow to cool the sensors of the sensor assembly 40 and/or help maintain clear fields of view for the sensors. The blower 78 may be any suitable type, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type. The blower 78 may include an electric motor. The blower 78 may include an inlet and an exhaust. The blower 78 may draw air in the inlet and blow such air out of the exhaust. The blower 78 can be fixed to the support bracket 54, e.g., in the first second chamber C2.

The blower 78 is operatively coupled to the inlet cover 66 to draw air through the inlet cover opening 68. In other words, the inlet of the blower 78 may be fluidly coupled to the inlet cover opening 68 such that air flowing into the inlet cover opening 68 travels to the inlet of the blower 78. For example, the assembly 20 may include a duct 80 connecting the inlet cover opening 68 to inlet of the blower 78. The duct 80 may include and extend between an inlet 82 and an outlet 84. The inlet 82 of the duct 80 may be connected to the inlet cover opening 68. The outlet 84 of the duct 80 may be connected to the inlet of the blower 78. The duct 80 may be foam, or any other suitable material for directing air flow. The duct 80 may be sealed to the inlet cover 66. For example, the inlet 82 of the duct 80 may abut the inlet cover 66, e.g., about the inlet cover opening 68. The duct 80 may be compressed between the blower 78 and the inlet cover 66. The inlet 82 of the duct 80 and the outlet 84 of the duct 80 may have a common orientation. In other words, air may flow into the inlet 82 and out of the outlet 84 in a same direction. For example, air may flow into the inlet 82 in a vehicle-forward direction and air may flow out of the outlet 84 in the vehicle-forward direction. The inlet 82 and the outlet 84 may be laterally offset relative to each other. In other words, the inlet of the duct 80 may be spaced from the outlet along the cross-vehicle axis.

The sensor assembly 40 can include one or more sensor ducts 86, 88 that direct air from the blower 78 to one or exhausts 90, 92 at one or more of the sensors 74, 76. Air from the exhausts 90, 92 may blow, e.g., onto and/or across lenses or the like of the sensors 74, 76. A first sensor duct 86 may extend from the blower 78 to a first exhaust 90 oriented to direct air across one sensor of the sensor assembly 40, e.g., across the lidar sensor 76 positioned at the inlet cover opening 68. The first exhaust 90 may be ring-shaped surrounding the lidar sensor 76. The first exhaust 90 may direct air downward. The first exhaust 90 may provide a curtain of air that surrounds the lidar sensor 76. A second sensor duct 88 may extend from the first sensor duct 86 to a second exhaust 92 oriented to direct air across another sensor of the sensor assembly 40, e.g., across a lens of the camera 74 in the third chamber C3.

The adjectives "first" and "second" are used throughout this document as identifiers and do not signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a liftgate having a frame and a body panel supported by the frame, the body panel defining a plurality of openings, the openings providing access to the frame;
   a first cover covering the plurality of openings of the body panel;
   a second cover supported by the first cover and defining a chamber therebetween; and
   a sensor assembly supported within the chamber between the first cover and the second cover;
   the second cover defining a second cover opening; and
   an inlet cover supported at the second cover opening.

2. The assembly of claim 1, further comprising a support plate fixed to the frame of the liftgate, the sensor assembly supported by the support plate.

3. The assembly of claim 2, wherein the frame and the body panel are between the first cover and the support plate.

4. The assembly of claim 2, further comprising a plurality of fasteners fixing the support plate to the frame, the plurality of fasteners at the plurality of openings of the body panel.

5. The assembly of claim 2, further comprising a support bracket fixed to the support plate, the sensor assembly supported by the support bracket.

6. The assembly of claim 5, wherein the first cover defines an opening, the support bracket extending through the opening.

7. The assembly of claim 6, further comprising a third cover supported by the first cover and covering at least part of the opening of the first cover.

8. The assembly of claim 7, further comprising a fourth cover supported by the first cover and covering at least part of the opening of the first cover, the support bracket extending through the opening between the third cover and the fourth cover.

9. The assembly of claim 1, wherein the inlet cover defines an inlet cover opening, and wherein the sensor assembly includes a blower operatively coupled to the inlet cover to draw air through the inlet cover opening.

10. The assembly of claim 9, further comprising a duct connecting the inlet cover opening to the blower.

11. The assembly of claim 10, wherein the duct includes an inlet and an outlet, the inlet and the outlet have a common orientation and are laterally offset relative to each other.

12. The assembly if claim 10, wherein the duct is sealed to the inlet cover.

13. The assembly of claim 9, wherein the sensor assembly includes a sensor and a second duct that extends from the blower to an exhaust oriented to direct air across the sensor of the sensor assembly.

14. The assembly of claim 13, wherein the sensor is a lidar sensor and the exhaust is ring-shaped surrounding the lidar sensor.

15. The assembly of claim 14, wherein the lidar sensor is positioned at the inlet cover opening.

16. The assembly of claim 13, the sensor assembly includes a second sensor and a third duct that extends from the second duct to a second exhaust oriented to direct air across the second sensor of the sensor assembly.

17. The assembly of claim 16, wherein the second sensor is a camera.

18. The assembly of claim 16, further comprising a sensor cover supported by the liftgate and defining a second chamber, the second sensor in the second chamber.

19. An assembly, comprising:
    a liftgate having a frame and a body panel supported by the frame, the body panel defining a plurality of openings, the openings providing access to the frame;
    a first cover covering the plurality of openings of the body panel;
    a second cover supported by the first cover and defining a chamber therebetween;
    a sensor assembly supported within the chamber between the first cover and the second cover; and
    a support plate fixed to the frame of the liftgate, the sensor assembly being supported by the support plate;
    the frame and the body panel being between the first cover and the support plate.

20. An assembly, comprising:
    a liftgate having a frame and a body panel supported by the frame, the body panel defining a plurality of openings, the openings providing access to the frame;
    a first cover covering the plurality of openings of the body panel;
    a second cover supported by the first cover and defining a chamber therebetween;
    a sensor assembly supported within the chamber between the first cover and the second cover; and
    a support plate fixed to the frame of the liftgate, the sensor assembly being supported by the support plate; and
    a support bracket fixed to the support plate, the sensor assembly being supported by the support bracket.

* * * * *